United States Patent
Lehmker et al.

(10) Patent No.: US 6,408,517 B1
(45) Date of Patent: Jun. 25, 2002

(54) METHOD AND APPARATUS FOR ASSEMBLING A THREE-DIMENSIONAL STRUCTURAL COMPONENT

(75) Inventors: Joachim Lehmker, Lunestedt; Karl-Heinz Muehlnickel, Jork; Udo-Henning Stoewer, Bremen; Ruediger Vollmerhaus, Hamburg, all of (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/603,870

(22) Filed: Jun. 26, 2000

(30) Foreign Application Priority Data

Jun. 26, 1999 (DE) ........................................ 199 29 471

(51) Int. Cl.$^7$ ............................................... B21D 53/88
(52) U.S. Cl. ..................... 29/897.2; 29/407.09; 29/423; 29/466; 29/467; 29/469; 29/56.6; 29/281.1
(58) Field of Search ............................... 29/897.3, 423, 29/429, 428, 430, 466, 467, 469, 897.2, 897, 897.32, 407.1, 407.09, 56.6, 281.1, 281.6, 281.3, 559; 769/47, 296

(56) References Cited

U.S. PATENT DOCUMENTS

| | | | |
|---|---|---|---|
| 2,370,083 A | * 2/1945 | Smith | 29/467 |
| 2,374,894 A | * 5/1945 | Pioch et al. | 29/466 |
| 2,391,510 A | * 12/1945 | Pioch et al. | 29/430 |
| 4,259,776 A | 4/1981 | Roda | |
| 4,371,108 A | * 2/1983 | Roggendorff et al. | 29/430 |
| 5,694,690 A | 12/1997 | Micale | |
| 6,230,382 B1 | * 5/2001 | Cunningham et al. | 29/407.1 |

FOREIGN PATENT DOCUMENTS

| | | |
|---|---|---|
| DE | 3438584 | 5/1985 |
| FR | 2702982 | 9/1994 |
| FR | 2788743 | 7/2000 |

* cited by examiner

Primary Examiner—S. Thomas Hughes
Assistant Examiner—T. Nguyen
(74) Attorney, Agent, or Firm—W. F. Fasse; W. G. Fasse

(57) ABSTRACT

Three-dimensional large scale bodies such as jumbo aircraft fuselages (14) are assembled in body sections around a longitudinal central assembly core (1) which itself is mounted at its ends and accessible all around along its length. Robots carrying tools for holding, transporting and precisely positioning preassembled wall sections, are movable along the central assembly core (1). First, at least one floor support grid (2 or 3) is releasably mounted to the central assembly core. Then, side wall sections (4, 5) are first secured to the floor support grids. Then, top and bottom wall sections (10, 8) are secured to the side wall sections (4, 5) to form a body section (BS) of the large scale body (14). Neighboring body sections are secured to each other along cross-seams. Upon completion, the floor support grids are released from the central assembly core (1) and the core is removed preferably withdrawn longitudinally from the assembled large body.

10 Claims, 4 Drawing Sheets

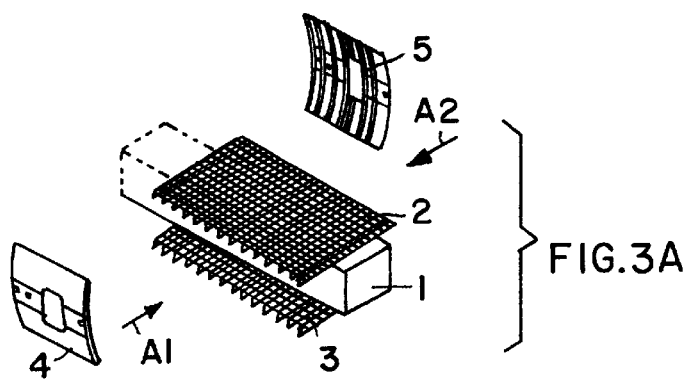
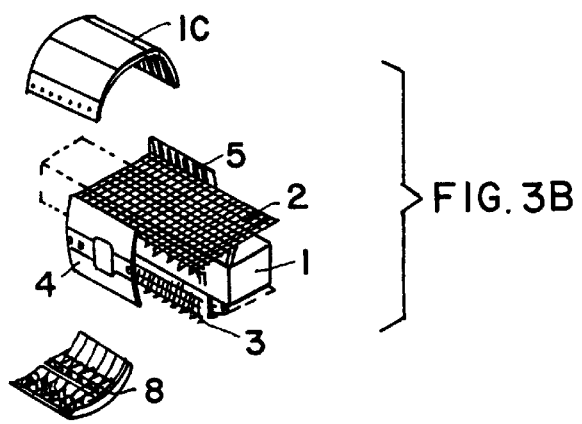
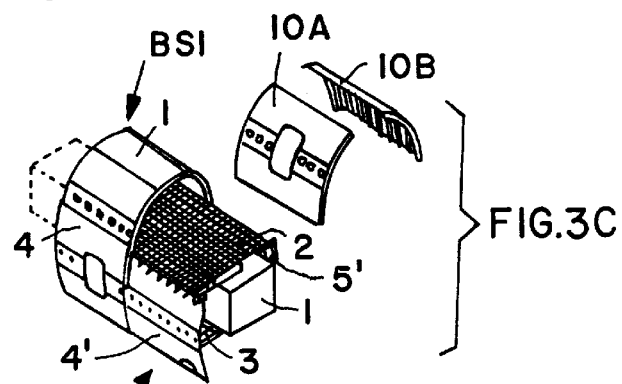
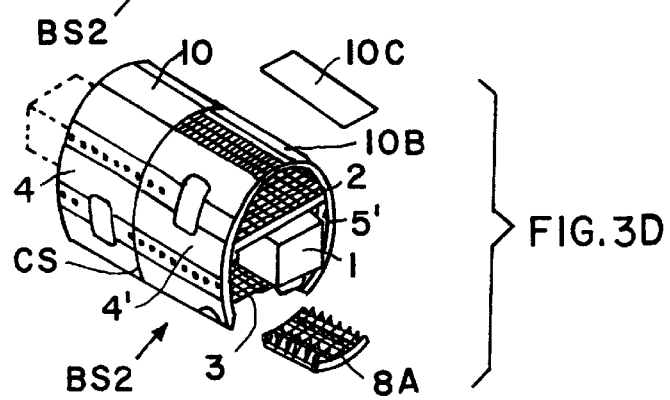

METHOD AND APPARATUS FOR ASSEMBLING A THREE-DIMENSIONAL STRUCTURAL COMPONENT

PRIORITY CLAIM

This application is based on and claims the priority under 35 U.S.C. §119 of German Patent Application 199 29 471.2, filed on Jun. 26, 1999, the entire disclosure of which is incorporated herein by reference.

FIELD OF THE INVENTION

The invention relates to a method for producing large scale three-dimensional structural components such as an aircraft fuselage or the like having a barrel-shaped configuration or an oval or circular cross-section.

BACKGROUND INFORMATION

So-called large volume or jumbo aircraft have fuselages assembled from fuselage wall sections, preferably wall sections reinforced by load supporting elements such as stringers and spars or ribs. One or more plate-shaped floor support grids are mounted inside such large scale fuselages. The floor support grids extend longitudinally inside the fuselage and from one side wall to the opposite side wall.

German Patent Publication DE 34 38 584 A1 discloses an apparatus for the manufacture of an aircraft fuselage, whereby large surface area, curved structural elements are assembled to form fuselage sections. These fuselage sections are then interconnected by an automatically operating orbital riveting machine and by manual labor to form fuselage component sections including slide wall sections and top and bottom wall sections. The riveting takes place along so-called cross-seams, whereby the automatic orbital riveting machine travels along these cross-seams guided by a machine guide rail extending as a ring around the aircraft body or fuselage. The entire orbital riveting machine or system is mounted on a carriage that can travel along or rather in parallel to the longitudinal aircraft axis also referred to as the X-axis.

In the manufacture of aircraft fuselages, it is further known to assemble subassemblies in rigid jigs that determine the geometry of the subassembly. Such rigid jigs operate on the principle of orienting all subassemblies relative to a zero position in a rigid system. According to such a known system, the preassembled subassemblies are deposited in jigs and located relative to fixed system points with a so-called zero alignment. Such a zero alignment system has the disadvantages that the zero alignment can result in deviations, particularly along the interface between individually neighboring subassemblies. Such deviations can fall outside permissible tolerance ranges. Moreover, an adjusting of the individual subassemblies in order to assure the desired overall geometry of the aircraft fuselage is not possible. However, as long as the fuselage has a cylindrical configuration with a circular cross-section, the use of the zero alignment or positioning is possible, whereby the subassemblies forming the lower body half are positioned and riveted first whereupon the cabin floor is inserted and connected with the spars or ribs of the lower body half. A so-called auxiliary carrier, also referred to as a presenting frame, holds the subassembly in position relative to the jig and tool system without any possibility of making compensating adjustments in the positioning. Thus, positional deviations of the floor structure relative to the fuselage body are possible, but cannot be corrected. Once the floor structure and the lower fuselage half are assembled, the upper side wall shell sections and upper shell sections are secured to the lower half, whereby the positioning is again performed by way of the above-mentioned zero alignment.

Efforts have been made for avoiding some of the above described drawbacks. Thus, U.S. Pat. No 5,694,690 (Micale) describes a method for producing large scale aircraft bodies from a plurality of subassemblies, whereby the subassemblies or selected components of the subassemblies are provided with drilled coordination holes for an accurate positioning and assembly of the subassemblies. The coordination holes make sure that the elements of the subassembly are already accurately positioned relative to each other so that the resulting subassemblies become self-locating and thus intrinsically determine the final contour of the aircraft body independently of tooling. The drilling of the coordination holes is accomplished by a computer controlled precision robot which is directed to the drilling locations using a digital data set taken directly from original digital part definition records.

The above described methods leave room for improvement, especially with regard to reducing the assembly costs while still assuring the required accuracy in the configuration of the final large scale product, such as a fuselage for a jumbo aircraft.

OBJECTS OF THE INVENTION

In view of the above it is the aim of the invention to achieve the following objects singly or in combination:

- to provide an assembly method and apparatus for producing large scale components such as jumbo aircraft bodies, whereby the assembly permits maintaining required, precise tolerance ranges without the need for high precision jigs and without drilling precisely positioned locating holes, while still assuring the, accuracy of the three-dimensional large scale body;
- to substantially increase the accessibility of tools to the assembly positions for performing most assembly work by robots, particularly the forming of longitudinal and cross-seams; and
- to provide a system and apparatus which substantially is independent of the length of the large scale body so that substantially any required number of subassemblies can be jointed to each other without any additional matching adjustments so that an entire aircraft fuselage can be assembled.

SUMMARY OF THE INVENTION

The above objects have been achieved according to the invention by performing the following steps. A prefabricated longitudinal central assembly core is mounted at its ends, for example between support columns. Then, at least one support grid section, such as a floor grid section, is secured to the central assembly core with the aid of clamping tools which mechanically fasten the grid section to the core. Then, shell-shaped body sections such as fuselage top and bottom wall sections and side wall sections, having a defined internal stiffness of their own, are positioned by robot tools which are preferably computer controlled, sequentially around the central assembly core and then mechanically interconnected, for example by riveting. The positioning is performed in such a way that first side wall sections are positioned opposite one another and secured to the support grid section or support grid sections by mechanical tools. Thereafter, bottom wall sections and top wall sections are sequentially secured to the side wall sections and to one another to form individual body sections of a large body such as a fuselage in which the support grid section or support grid sections form a cabin floor support. The fuselage is then completed by interconnecting individual body sections to each other, for example by riveting along cross-seams.

It is an important advantage of the invention that the assembly of the prefabricated wall sections or subsections can take place within a precise tolerance range, whereby, for example an aircraft fuselage section can be assembled with the required precision, yet without jigs or locating holes. All prefabricated subsections, namely the support grid and the wall sections are positioned relative to the prefabricated central assembly core which itself is lightweight and has its own stiffness. The central assembly core forms part of the assembly station and can be reused. The prefabricated fuselage planking, namely the prefabricated wall sections are mounted to the floor support grid or to the floor support grids held in precise positions by the longitudinal central assembly core. By first mounting the side wall sections to the support grid or grids, it becomes possible to mount or assemble the bottom wall section and the top wall section to the side wall sections without any difficulties. In a preferred form, the side wall sections are first secured to the support grid or grids in a row, whereupon the upper and lower or rather the top and bottom wall sections can also be secured in respective rows to the row of side wall sections.

According to a preferred embodiment of the present method, the three-dimensional large structural component is assembled of at least two body sections which are interconnected by the above-mentioned cross-seam, whereby each individual body section is so formed that the lateral or side wall sections are positioned opposite each other and are mechanically connected to the support grid or grids to form a first subsection. Then the respective upper and/or lower shells are mechanically connected to the two side wall sections to form a first body section. Once the first body section is assembled the second body section is assembled in the same manner and further sections are assembled next to the already assembled sections. Each body section is mechanically connected, e.g. by riveting, to the preceding or neighboring body section along the cross-seams.

The method according to the invention is preferably performed by an apparatus that combines the following features. An elongated central assembly core for holding at least one or more support grids is secured with one end to amounting held for example by a column, while the other end of the core is secured to a second mounting. Both mountings hold the core in a precise position relative to the longitudinal axis of a large scale body to be assembled. Tools in the form of movable robots are provided for positioning body shell sections relative to the assembly core and relative to each other. A central processing unit is operatively connected to the tool means for controlling the tool means when they perform a holding, transporting and positioning operation for the assembly of shell sections relative to the floor grid or grids held by the core, whereupon additional tools perform the securing operations.

When the assembly is completed, the large scale body is supported by other supports, the central assembly core is released from the support grid or grids and removed from the body, for example by pulling the core longitudinally out of the body.

BRIEF DESCRIPTION OF THE DRAWINGS

In order that the invention may be clearly understood, it will now be described in connection with example embodiments, with reference to the accompanying drawings, wherein:

FIGS. 3A to 3D show perspective, partly exploded views of the sequential assembly steps, whereby the assembly progresses from FIG. 3A to FIG. 3D.

DETAILED DESCRIPTION OF PREFERRED EXAMPLE EMBODIMENTS AND OF THE BEST MODE OF THE INVENTION

Figure 1A:
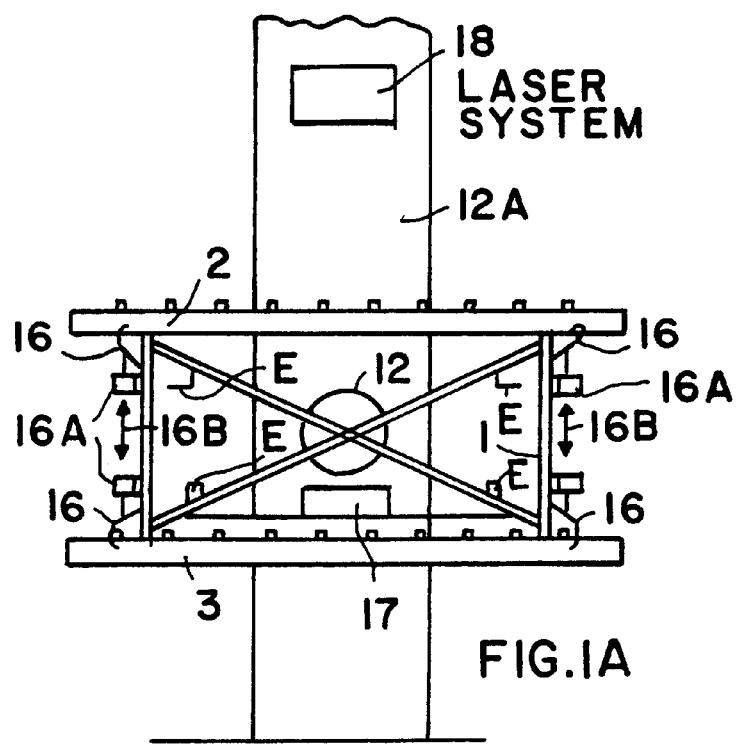
FIGS. 1A to 1D are views substantially in the direction of the arrow I in FIG. 2, illustrating a sequence of steps according to the invention in the assembly of a large structural component such as a jumbo aircraft fuselage having first and second floors supported by respective first and second floor support grids.

FIG. 1A illustrates the first stage in which a longitudinal central assembly core 1 is secured with its far end to a core mounting 12 forming part of a mounting column 12A. The opposite end of the central assembly core 1 is held in place by a further core mounting including a core guide 13 in a mounting column 13A to be described below with reference to FIG. 2. The central axis of the central assembly core 1 coincides with and extends in the direction of the central longitudinal axis of an aircraft fuselage not shown in FIG. 1. Preferably, the central assembly core 1 has a rectangular cross-section. An aircraft fuselage having two decks requires an upper or first floor support grid 2 and a lower or second floor support grid 3. The grids 2, 3 are mechanically secured in a releasable manner to the central assembly core 1 by symbolically shown clamping tools 16 driven by clamp drives 16A which in turn are controlled by a computer 17. A laser distance measuring system 18 is positioned for measuring any deviation of the central assembly core 1 from standard dimensions stored in the memory of the computer 17. The clamping tools 16 are adjustable by the clamp drives 16A in the Z-direction of the aircraft, namely up and down as indicated by the arrows 16B. By adjusting the position of the clamps 16 in the Z-direction, it is possible to compensate any shape and dimension variations of the central assembly core 1, for example when the core 1 should be bent in the Z-direction between its two supported ends. Thus, it is advantageously possible to compensate also for any dimensional deviations in the individual fuselage sections forming body sections or portions of the fuselage. The above-mentioned laser system 18 is conventional and capable of measuring the bending and/or dimensional deviations tin a contactless manner.

Figure 1B:
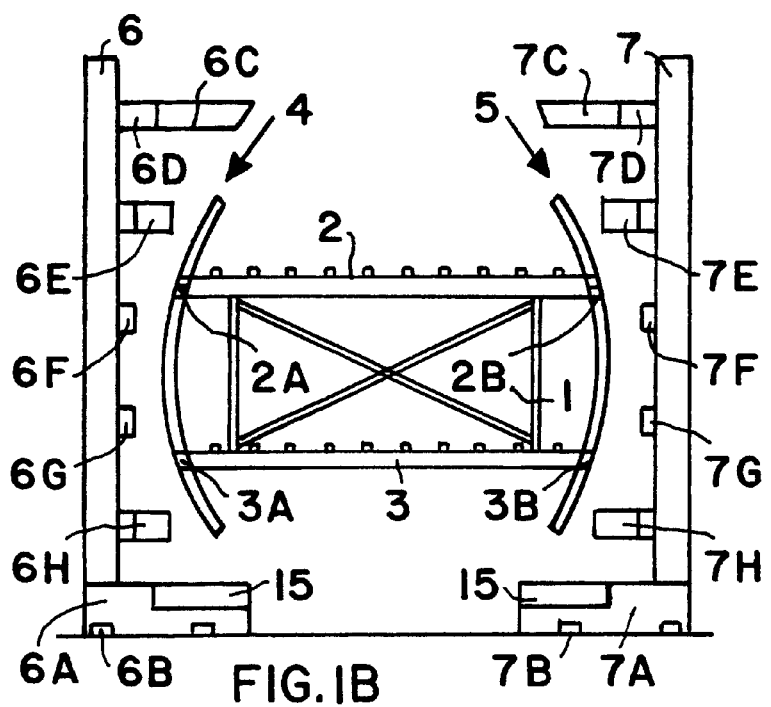

FIG. 1B shows a view similar to that of FIG. 1A, but now illustrating the second stage of assembly with the help of robot tools 6 and 7 supported on carriages 6A and 7A movable in parallel to the longitudinal aircraft axis on rollers 6B and 7B. Each robot tool 6 and 7 carries respective elongated tool members 6C, 7C driven by individual drive elements 6D and 7D. Additional tools 6E, 6F, 6G, 6H and 7E, 7F, 7G, 7H are symbolically shown in FIG. 1B for holding and positioning fuselage wall sections 4, 5, 8, 10. All robot tools 6, 7 and their individual tool members are operated under the control of computers 15. The drives for the carriages 6A, 7A are also computer controlled. The robot tools are off conventional construction and capable of holding, transporting and precisely positioning fuselage wall sections 4 and 5 which are side wall sections of the fuselage and are connected to the floor support grids 2 and 3. Bottom wall sections 8 land top wall sections 10 are connected to the side wall sections 4, 5. As shown in FIG. 1B, the side wall sections 4 and 5 are mechanically connected to the upper floor or first grid section 2 at 2A and 2B and to the lower floor or second grid section 3 at 3A and 3B. The holding and positioning elongated tool members 6C, 7C shown in FIG. 1B are capable of holding a top wall section 10 shown in FIG. 1D to be described in more detail below. All operations are computer controlled.

Figure 1C:
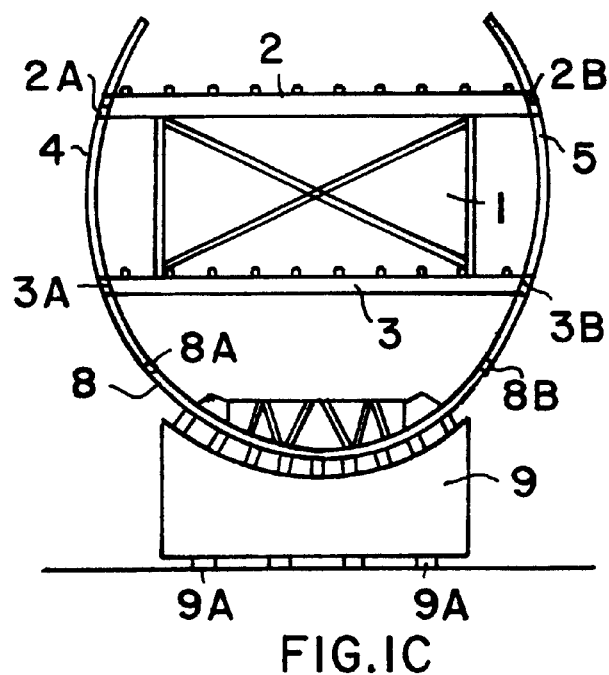

FIG. 1C shows the third assembly stage according to the present method in which a bottom wall section 8 transported by a robot carriage 9 with rollers 9A driven by drives 9B, is secured to the side wall sections 4 and 5 at 8A and 8B. All the connections between the Subsections are conventional. The carriage 9 and its components are also part of the robot system which is controlled by programs stored in a memory of computers 15.

Figure 1D:
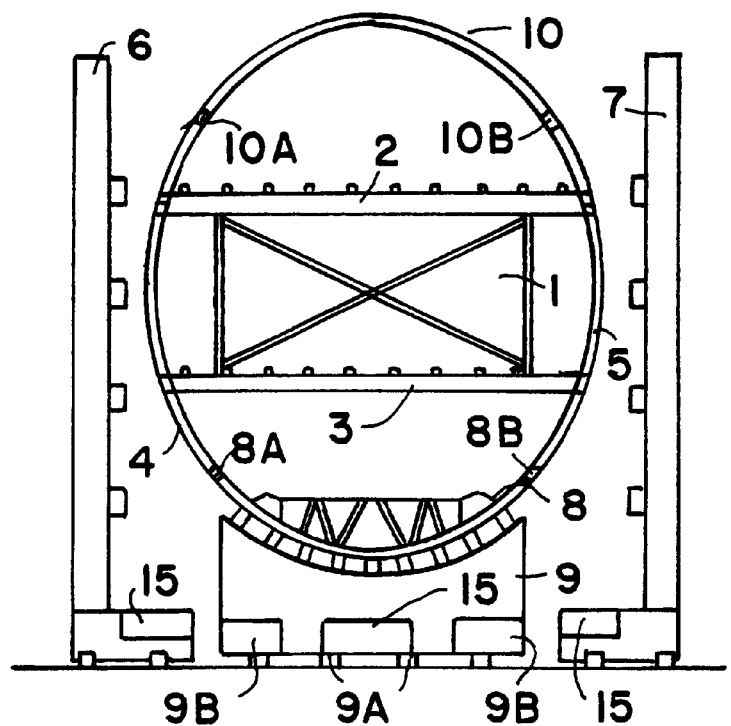

FIG. 1D shows the fourth stage of the present method in which an upper wall section 10 has been secured to the side wall sections 4 and 5 at 10A and 10B. As mentioned, the tool members 6C and 7C of the robots 6 and 7 are capable of holding and positioning the top wail sections 10 relative to the side wall sections 4 and 5. With the completion of the fourth assembly stage one body section BS of an aircraft body 14, see FIG. 2, is completed.

Figure 2:
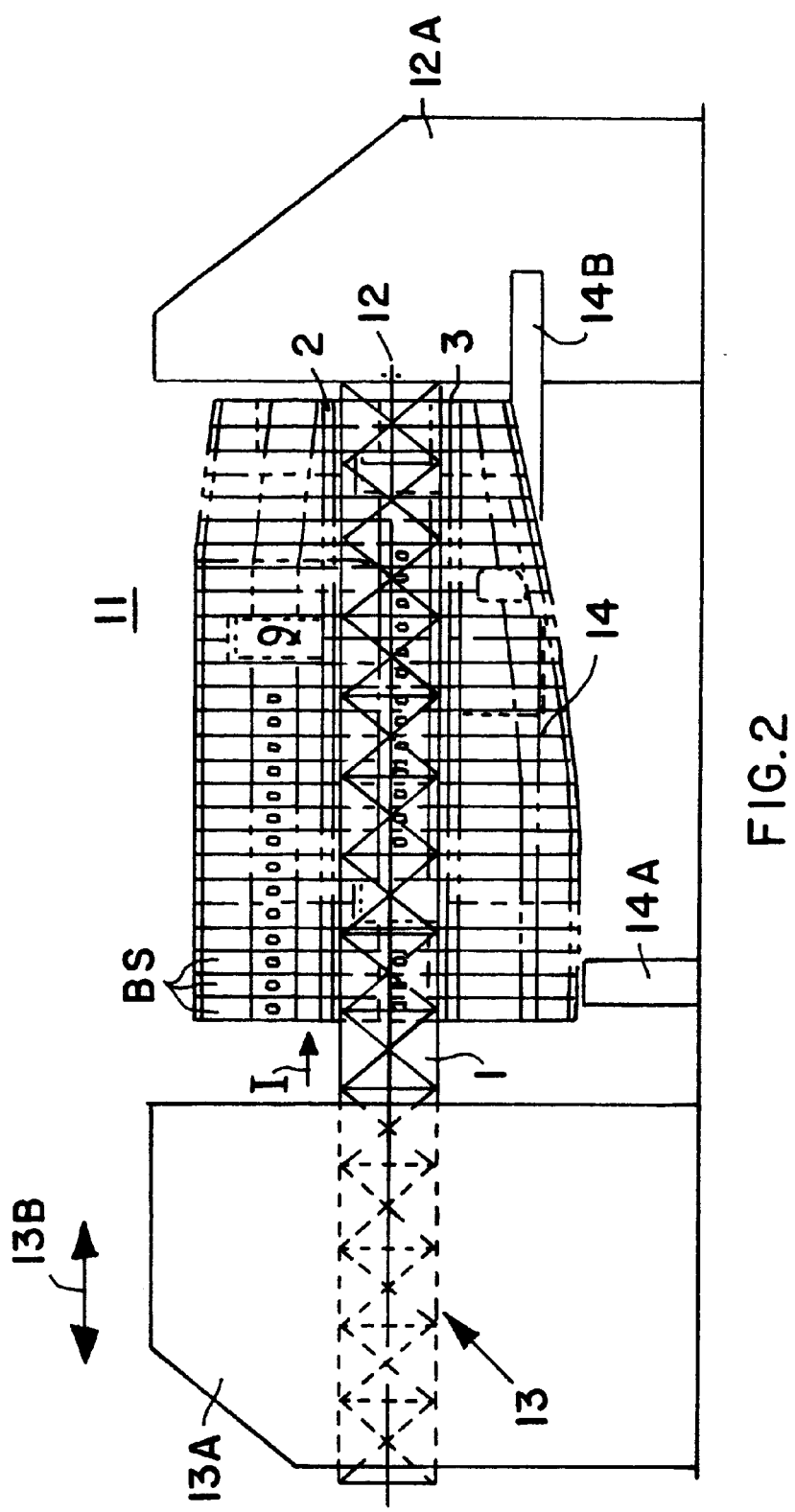
FIG. 2 is a side view of the present assembly station perpendicularly to the longitudinal or X-axis of the aircraft showing a plurality of assembled body sections.

Referring to FIG. 2 the central assembly core 1 forms the basic component of the apparatus for the performance of the present method in the assembly of a large structural component, for example the fuselage of a jumbo aircraft. The central assembly core 1 is equipped with elements E (see FIG. 1A) for supporting supply conduits such as, electrical conductors, compressed air ducts for the operation of tools and power supplies for illuminating purposes as well as tool carriers. The central assembly core 1 is preferably so constructed that it is capable to carry either one support grid for a freight deck in a freight loading space and a floor support grid for a passenger deck or the core 1 may carry two floor support grid sections 2 and 3 for two passenger decks of a multi-deck jumbo aircraft fuselage 14 shown in FIG. 2.

The mounting column 12A with its core mounting 12 and mounting column 13A with its core guide 13 are so constructed that the central assembly core 1, once mounted, is accessible all around between the core ends, because the core 1 is mounted only at its ends so that, the side bottom and top wall sections 4, 5 and 8, 10 can be mounted without any access problems. The maintaining of the proper curvature and of the correct positioning of the prefabricated wall sections 4, 5, 8 and 10 relative to the central assembly core 1 is assured by the computer controlled robot system 6, 7 and 9, whereby the computers 15 and 17 control the holding, transporting and positioning of the wall shell sections. The alignment of all wall shell sections 4, 5 and 8, 10 with each other for interconnecting these wall sections is accomplished with the aid of a contactless laser measuring system 18 that provides its information to the computers 15 and 17 which control all the tool drives. For example, the tool drives 6D and 7D assure the proper positioning of the tools 6C and 7C and thus of the top wall section 10. The same applies to the positioning of the carriage 9 with the bottom wall section 8 and to the other tools 6E to 6H and 7E to 7H and their respective drives for positioning the side wall sections 4 and 5.

The most important advantage of the present system is seen in that the finished product, such as a jumbo aircraft body or fuselage 14, does satisfy the required high precision tolerances because the assembly of the individual sections already satisfies fine tolerances assured by the laser controlled positioning of the individual wall sections 4, 5, 8 and 10.

It is also advantageous to separately preassemble the wall sections 4, 5, 8 and 10 so that their outer contour curvature and geometry conform to the theoretically correct position within the shell of the whole body 714 relative to the zero axis of the system, for example relative to the central longitudinal axis of the central assembly core 1 and of the aircraft body 14. The correct curvature and geometry of the contour curvature of the wall sections 4, 5, 8 and 10 is already assured by the preassembly of these sections and the present assembly sequence maintains the correct curvature and geometry. Further, the wall sections that together form the fuselage shell have an adequate inherent stiffness so that these wall sections will conform to the designed aircraft contour. More specifically, the inherent stiffness of the sections is sufficient if the wall sections do not change their outer contour during the assembly by the present computer controlled robot carrier and positioning system.

The apparatus shown in FIG. 2 in a side view includes the above-mentioned core mounting 12 for example in the form of a clamping device 12 carried by the mounting column 12A for holding one end of the central assembly core 1. The other core end is mounted to the above-mentioned core guide 13 in the mounting column 13A functioning as a clamping and guide column 13A. The core guide 13 includes a clamping device that permits withdrawing the central assembly core 1 from the assembled fuselage or body 14, which upon completion rests on external supports 14A and 14B so that the core 1 may be withdrawn to the left in FIG. 2 by the core clamping device of the core guide 13. Thus, the central assembly core 1 can be positioned as indicated by the double arrow 13B. The clamping device is supported by the column 13A. The above described transporting holding and positioning robots 6 and 7 with their respective tools are part of the mounting station 11. However, these robots 6 and 7 are not shown in FIG. 2. These robots are movable alongside the core 1 of the station 11 shown in FIG. 2 as indicated by the double arrow 13B to transport, hold and position the wall shell sections 4, 5, 8 and 10 as described above with references to FIGS. 1A to 1D.

As soon as the fuselage 14 is completed the supports 14A and 14B are moved into position for the removal of the core 1. Prior to the removal, the above described computer controlled clamping tools 16, 16A are released from the floor grids 2 and 3, whereupon the core 1 can be moved to the left by the guide mechanism 13. For this purpose it is advantageous if the clamping tools 16 are driven by their tool drive 16A as indicated by the arrows 16B to provide sufficient clearance between the tools that are mounted to the core 1 for holding or clamping the floor grids 2 and 3.

FIGS. 3A, 3B, 3C and 3D also illustrate the sequence of assembly steps according to the invention, however, in a perspective illustration.

FIG. 3A shows that the floor grids 2 and 3 have been secured to the assembly core 1 and the side wall shell sections 4 and 5 are ready for positioning and securing to the grids 2 and 3. For this purpose the robots, or rather the robot tools move the side wall sections 4 and 5 in the directions of the arrows A1 and A2 toward the grids 2 and 3.

FIG. 3B shows that the side wall sections 4 and 5 have been secured to the grids 2 and 3. Next, a top wall shell section 10 is moved into position for securing to the side wall sections 4 and 5. Next, a bottom wall shell section 8 is moved into position by the carriage 9 for attachment to the grids 2 and 3.

FIG. 3C shows that one fuselage or body section BS1 is completed. The next fuselage section BS2 has its side wall panel 4' already secured to the grids 2 and 3. The opposite side wall sections 5' has also been secured to the grids 2 and 3. The topwall shell section of the body section BS2 differs from the top section 10 in that the second top wall shell section includes three components 10A, 10B and 10C. The components 10A and 10B areconnected to the respective side wall sections 4' and 5' whereupon, as shown in FIG. 3D the central top component 10C is secured to the two other top components 10A and 10B. The bottom section 8A is then positioned and secured to the lower edges of the side sections 4' and 5' as described, to form the second fuselage section FS2. The steps are then repeated for the formation of further body sections BS to form the fuselage.

Once the two body sections BS1 and BS2 are assembled as described, the sections are secured to each along a cross-seam CS shown in FIG. 3D, for example by riveting robot tools. From the just described assembly of the fuselage section BS2 it is clear, that the individual wall shell sections may be further divided into a plurality of components as shown for the top section 10 divided into three components 10A, 10B and 10C.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for assembling at least one body section of a large scale structural component, said body section including at least one support grid and a plurality of prefabricated wall sections including a top wall section (10), side wall sections (4, 5), and a bottom wall section (8), said method comprising the following steps:
   (a) prefabricating said wall sections (4, 5, 8, 10), and said at least one support grid (2, 3),
   (b) mounting a central assembly core (1) to two end supports (12, 13) for said central assembly core (1),
   (c) releasably securing said at least one support grid (2 or 3) to said central assembly core (1),
   (d) first positioning said prefabricated side wall sections (4, 5) for mounting to said at least one support grid (2, 3),
   (e) permanently securing said prefabricated side wall sections (4, 5) to said at least one support grid,
   (f) second positioning said prefabricated top wall section (10) and said prefabricated bottom wall section (8) for mounting to said prefabricated side wall sections (4, 5),
   (g) permanently securing said prefabricated top wall section (10) and said prefabricated bottom wall section (8) to said prefabricated side wall sections (4, 5) to form at least one body section of said structural component, and
   (h) removing said central assembly core from said at least one body section, whereby said at least one support grid becomes an integral part of said at least one body section of said large scale structural component and using internal and external jigs is avoided.

2. The method of claim 1, further comprising controlling said first positioning and said second positioning by computer controlled positioning tools.

3. The method of claim 1, further comprising repeating said steps (d), (e), (f) and (g) for producing a plurality of body sections of said structural component, and securing neighboring body sections to each other along a cross-seam holding two neighboring body sections together.

4. The method of claim 3, wherein said repeating of steps is continued until the entire structural component is completed and then performing said step (h) of removing said central assembly core (1) from said structural component (14).

5. The method of claim 1, further comprising securing a first support grid (2) to a top side of said central assembly core (1), and securing a second support grid (3) to a bottom side of said central assembly core (1), and then performing said steps (d), (e), (f) and (g).

6. The method of claim 3, further comprising generating alignment signals for positioning said plurality of body sections in proper alignment with each other, and aligning said plurality of body sections relative to each other in response to said alignment signals.

7. The method of claim 6, wherein said alignment signals are laser generated and supplied to a computer for controlling said first and second positioning steps.

8. The method of claim 4, further comprising supporting (at 14A, 14B) said structural component (14) upon completion of the structural component (14) and releasing said at least one support grid from said central assembly core (1) prior to removing said central assembly core (1) from said structural component.

9. The method of claim 8, further comprising removing said central assembly core (1) by sliding and guiding said central assembly core (1) along a core guide (13) axially out of said structural component (14).

10. The method of claim 8, removing said central assembly core by disassembling said central assembly core (1) at least into shorter core portions and removing said shorter core portions from said structural component (14).

* * * * *

UNITED STATES PATENT AND TRADEMARK OFFICE
CERTIFICATE OF CORRECTION

PATENT NO.     : 6,408,517 B1
DATED          : June 25, 2002
INVENTOR(S)    : Lehmker et al.

It is certified that error appears in the above-identified patent and that said Letters Patent is hereby corrected as shown below:

<u>Title page, Item [54] and Column 1, line 1,</u>
After "METHOD", delete "AND APPARATUS".

<u>Column 5,</u>
Line 14, before "are", replace "Subsections" by -- subsections --;
Line 22, after "top", replace "wail" by -- wall --;
Line 31, after "as", delete ",".

<u>Column 6,</u>
Line 7, after "body", replace "714" by -- 14 --.

<u>Column 7,</u>
Line 5, after "The", replace "topwall" by -- top wall --;
Line 8, after "10B", replace "areconnected" by -- are connected --.

Signed and Sealed this

Fifteenth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,408,517 B1                                    Page 1 of 1
DATED         : June 25, 2002
INVENTOR(S)   : Lehmker et al.

It is certified that error appears in the above-identified patent and that said Letters Patent is hereby corrected as shown below:

<u>Title page,</u>
Item [75], Inventors, replace "Hamburg" by -- Buxtehude --.

Signed and Sealed this

Twenty-first Day of October, 2003

JAMES E. ROGAN
*Director of the United States Patent and Trademark Office*